United States Patent
Harrison et al.

(10) Patent No.: US 9,191,198 B2
(45) Date of Patent: Nov. 17, 2015

(54) METHOD AND DEVICE USING ONE-TIME PAD DATA

(75) Inventors: Keith Alexander Harrison, Bristol (GB); Timothy Paul Spiller, Bristol (GB); William John Munro, Bristol (GB); Christopher Tofts, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2909 days.

(21) Appl. No.: 11/455,231

(22) Filed: Jun. 16, 2006

(65) Prior Publication Data

US 2007/0016794 A1    Jan. 18, 2007

(30) Foreign Application Priority Data

Jun. 16, 2005  (GB) .................................. 0512229.6
Sep. 29, 2005  (GB) .................................. 0519842.9
Oct. 31, 2005  (GB) .................................. 0522093.4

(51) Int. Cl.
*H04L 9/06* (2006.01)
*H04L 9/08* (2006.01)
*H04L 9/32* (2006.01)

(52) U.S. Cl.
CPC ............ *H04L 9/0656* (2013.01); *H04L 9/0852* (2013.01); *H04L 9/3226* (2013.01); *H04L 2209/127* (2013.01); *H04L 2209/56* (2013.01)

(58) Field of Classification Search
CPC .... H04L 9/0656; H04L 9/3226; H04L 9/0852
USPC ............ 713/182, 193, 169, 180, 153; 380/28, 380/255, 260, 264, 281, 46, 30, 277, 42
See application file for complete search history.

(56) References Cited

U.S. PATENT DOCUMENTS

| | | | | |
|---|---|---|---|---|
| 4,179,734 A | * | 12/1979 | O'Leary | 712/202 |
| 4,218,582 A | * | 8/1980 | Hellman et al. | 380/30 |
| 5,001,754 A | * | 3/1991 | Deffeyes | 380/46 |
| 5,253,294 A | * | 10/1993 | Maurer | 380/264 |
| 5,266,942 A | | 11/1993 | Stoller | |
| 5,479,513 A | * | 12/1995 | Protopopescu et al. | 380/28 |
| 5,483,598 A | * | 1/1996 | Kaufman et al. | 380/43 |
| 5,515,438 A | | 5/1996 | Bennett | |
| 5,675,648 A | | 10/1997 | Townsend | |

(Continued)

FOREIGN PATENT DOCUMENTS

| | | |
|---|---|---|
| EP | 1024626 A1 | 8/2000 |
| EP | 1075108 A1 | 2/2001 |

(Continued)

OTHER PUBLICATIONS

Boykin, P. Oscar, and Vwani Roychowdhury. "Optimal encryption of quantum bits." Physical review A 67.4 (2003): 042317: pp. 1-6.*

(Continued)

*Primary Examiner* — Kari Schmidt
(74) *Attorney, Agent, or Firm* — Van Cott, Bagley, Cornwall & McCarthy

(57) ABSTRACT

In carrying out a task that consumes data from a one-time pad, task inputs comprising at least first data and second data from the pad, are combined together to form an output from which the data used from the pad cannot be recovered without knowledge of at least one of the first and second data. The task concerned can be, for example, the encrypting of a message or the creating of an attribute verifier.

12 Claims, 3 Drawing Sheets

(56) References Cited

U.S. PATENT DOCUMENTS

| | | | |
|---|---|---|---|
| 5,729,717 A | 3/1998 | Tamada et al. | |
| 5,732,139 A | 3/1998 | Lo et al. | |
| 5,764,767 A | 6/1998 | Beimel et al. | |
| 5,870,476 A * | 2/1999 | Fischer | 705/75 |
| 5,999,285 A | 12/1999 | Brandt et al. | |
| 6,021,203 A | 2/2000 | Douceur et al. | |
| 6,081,792 A | 6/2000 | Cucinotta et al. | |
| 6,101,255 A | 8/2000 | Harrison et al. | |
| 6,266,413 B1 * | 7/2001 | Shefi | 380/46 |
| 6,337,910 B1 * | 1/2002 | Goff et al. | 380/28 |
| 6,345,359 B1 | 2/2002 | Bianco | |
| 6,363,152 B1 | 3/2002 | Cornelius et al. | |
| 6,364,834 B1 | 4/2002 | Reuss et al. | |
| 6,445,794 B1 | 9/2002 | Shefi | |
| 6,678,379 B1 | 1/2004 | Mayers et al. | |
| 6,748,083 B2 | 6/2004 | Hughes et al. | |
| 6,802,000 B1 | 10/2004 | Greene et al. | |
| 7,036,020 B2 * | 4/2006 | Thibadeau | 713/193 |
| 7,099,478 B2 | 8/2006 | Tomlinson | |
| 7,245,722 B2 | 7/2007 | Hirota et al. | |
| 7,260,222 B2 | 8/2007 | Ishizuka et al. | |
| 7,327,845 B1 * | 2/2008 | Orr | 380/270 |
| 7,359,512 B1 | 4/2008 | Elliott | |
| 7,430,295 B1 | 9/2008 | Pearson et al. | |
| 7,461,323 B2 | 12/2008 | Matsumoto et al. | |
| 7,471,790 B2 | 12/2008 | Yoshida et al. | |
| 7,571,320 B2 * | 8/2009 | Davis | 713/169 |
| 7,602,919 B2 | 10/2009 | Berzanskis et al. | |
| 7,676,681 B2 | 3/2010 | Dillon et al. | |
| 2002/0002675 A1 | 1/2002 | Bush | |
| 2002/0133533 A1 | 9/2002 | Czajkowski et al. | |
| 2002/0146119 A1 * | 10/2002 | Liss | 380/42 |
| 2002/0159588 A1 * | 10/2002 | Kauffman et al. | 380/28 |
| 2002/0159601 A1 | 10/2002 | Bushmitch et al. | |
| 2002/0165835 A1 | 11/2002 | Igval | |
| 2003/0016821 A1 | 1/2003 | Hammersmith | |
| 2003/0026431 A1 * | 2/2003 | Hammersmith | 380/277 |
| 2003/0039357 A1 | 2/2003 | Alten | |
| 2003/0142821 A1 * | 7/2003 | Ross | 380/46 |
| 2003/0149869 A1 * | 8/2003 | Gleichauf | 713/153 |
| 2004/0028224 A1 * | 2/2004 | Liardet et al. | 380/37 |
| 2004/0101134 A1 * | 5/2004 | Incarnato et al. | 380/28 |
| 2004/0139347 A1 * | 7/2004 | Sakaguchi | 713/200 |
| 2004/0247130 A1 | 12/2004 | Koike | |
| 2004/0249503 A1 | 12/2004 | Sanchez | |
| 2005/0010533 A1 * | 1/2005 | Cooper | 705/64 |
| 2005/0036618 A1 * | 2/2005 | Gammel et al. | 380/255 |
| 2005/0105734 A1 | 5/2005 | Buer et al. | |
| 2005/0157875 A1 | 7/2005 | Nishioka et al. | |
| 2005/0167512 A1 | 8/2005 | Minemura et al. | |
| 2005/0190923 A1 | 9/2005 | Noh et al. | |
| 2006/0008087 A1 * | 1/2006 | Olive | 380/255 |
| 2006/0059343 A1 | 3/2006 | Berzanskis et al. | |
| 2006/0059347 A1 | 3/2006 | Herz et al. | |
| 2006/0059403 A1 | 3/2006 | Watanabe | |
| 2006/0080545 A1 | 4/2006 | Bagley | |
| 2006/0083379 A1 | 4/2006 | Brookner | |
| 2006/0265595 A1 * | 11/2006 | Scottodiluzio | 713/180 |
| 2006/0290941 A1 | 12/2006 | Kesler et al. | |
| 2007/0005955 A1 | 1/2007 | Pyle et al. | |
| 2007/0061865 A1 | 3/2007 | Bermudez et al. | |
| 2007/0140495 A1 * | 6/2007 | Berzanskis et al. | 380/278 |
| 2009/0207734 A1 | 8/2009 | Stultz et al. | |

FOREIGN PATENT DOCUMENTS

| | | |
|---|---|---|
| EP | 1470660 A1 | 10/2004 |
| EP | 1506636 A1 | 2/2005 |
| WO | WO-0131840 A1 | 5/2001 |
| WO | WO-0174005 A1 | 10/2001 |
| WO | WO-03098868 A1 | 11/2003 |
| WO | WO-2004073234 A2 | 8/2004 |
| WO | WO-2005083610 A1 | 9/2005 |
| WO | 2006/012638 A2 | 2/2006 |

OTHER PUBLICATIONS

Jarecki, Stanislaw. "Lecture 1: Crypto Overview, Perfect Secrecy, One-Time Pad." ICS268: Cryptography and Communication Security. (Sep. 28, 2004):pp. 1-10.*
Bennett, C.H. et al., "Generalized Privacy Amplification," Information Theory, IEEE Transactions on 41.6, 1995, pp. 1915-1923.
Christensen, C., "Cryptology Notes," (Research Paper), Fall 2005, 34 pages.

* cited by examiner

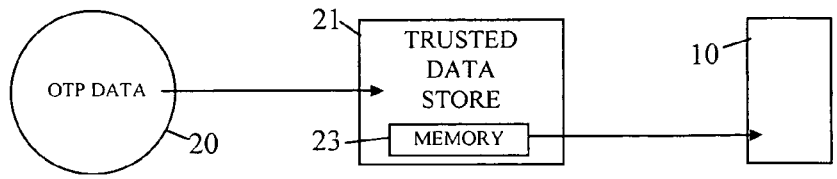
Figure 2A
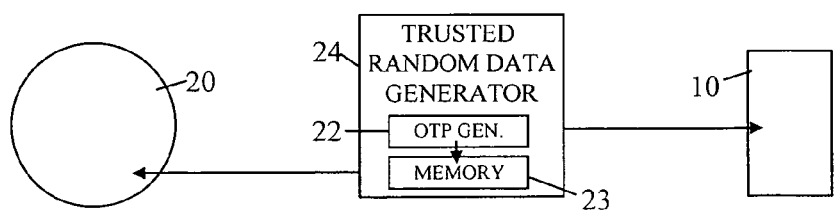
Figure 2B
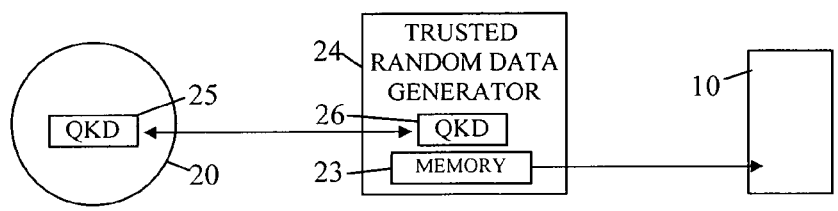
Figure 2C
Figure 3
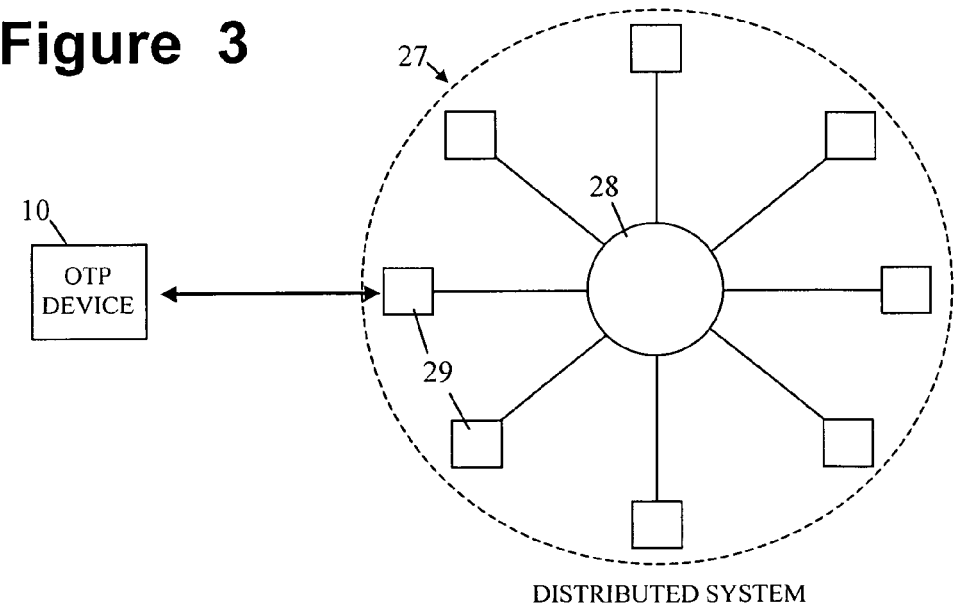
DISTRIBUTED SYSTEM

METHOD AND DEVICE USING ONE-TIME PAD DATA

FIELD OF THE INVENTION

The present invention relates to a method and device using one-time pad data.

BACKGROUND OF THE INVENTION

As is well known, two parties that posses the same secret random data can provably achieve both unbreakable secure communication using the Vernam cipher, and discrimination between legitimate messages and false or altered ones (using, for example, Wegman-Carter authentication). In both cases, however, data used from the secret random data shared by the parties must not be re-used. The term "one-time pad" is therefore frequently used to refer to the secret random data shared by the parties and this term, or its acronym "OTP", is used herein for secret random data shared by more than one party. Although for absolute security the one-time pad data must be truly random, references to one-time pads (OTP) herein includes secret data that may not be truly random but is sufficiently random as to provide an acceptable degree of security for the purposes concerned.

The fact that the OTP data is effectively consumed when used gives rise to a major drawback of the employment of OTP cryptographic systems, namely that the OTP must be replenished.

One approach to sharing new OTP data between two parties is for one party to generate the new OTP data and then have a copy of the data physical transported in a storage medium to the other party. This is costly to do, particularly where it needs to be done frequently; furthermore, it may not be feasible to adopt this approach (for example, where one of the parties is a communications satellite).

Another approach is to send the OTP data over a communications link encrypted using a mathematically-based encryption scheme. However, this approach effectively reduces the security level to that of the encryption scheme used; since no such schemes are provable secure and may well prove susceptible to attack as a result of advances in quantum computing, this approach is no better than replacing the intended OTP system with a mathematically-based scheme.

More recently, quantum key distribution (QKD) methods and systems have been developed which enable two parties to share random data in a way that has a very high probability of detecting any eavesdroppers. This means that if no eavesdroppers are detected, the parties can have a high degree of confidence that the shared random data is secret. QKD methods and systems are described, for example, in U.S. Pat. No. 5,515,438 and U.S. Pat. No. 5,999,285. In known QKD systems, randomly polarized photons are sent from a transmitting apparatus to a receiving apparatus either through a fiber-optic cable or free space.

As a consequence of the actual and perceived problems of sharing secret random data, OTP cryptographic systems have generally only been used in applications where the security requirements are paramount such as certain military and government applications.

Because OTP cryptography is generally only employed where very high security is needed, the types of system where it is used are those where other components of the overall system do not significantly compromise the level of security provided by OTP cryptography. In particular, there is little point in using OTP cryptography for passing secret messages between parties if the messages are to be stored or subsequently transmitted in a manner that is significantly less secure. Furthermore, the storage of the OTP data itself represents a security threat and unless the OTP data can be stored in a highly secure manner, it is better to share OTP data only at a time immediately before it is to be consumed.

SUMMARY OF THE INVENTION

According to a first aspect of the present invention, there is provided a method of using one-time pad data, comprising combining together inputs comprising at least first and second data from the pad, to form an output from which the data used from the pad cannot be recovered without knowledge of at least one of the first and second data.

According to a second aspect of the present invention, there is provided a device comprising a memory for holding one-time pad data, and a data processor arranged to receive inputs comprising at least first and second data from the pad, and to combine together these inputs to form an output from which the data used from the pad cannot be recovered without knowledge of at least one of the first and second data.

BRIEF DESCRIPTION OF THE DRAWINGS

Embodiments of the invention will now be described, by way of non-limiting example, with reference to the accompanying diagrammatic drawings of embodiments of the invention, in which:

FIG. 2A is a diagram illustrating the use of a trusted data store to transfer OTP data;

FIG. 2B is a diagram illustrating the use of a first form of trusted random data generator to generate and distribute OTP data;

FIG. 2C is a diagram illustrating the use of a second form of trusted random data generator to generate and distribute OTP data;

FIG. 3 is a diagram depicting a user OTP device interacting with a distributed data processing system;

BEST MODE OF CARRYING OUT THE INVENTION

Figure 1:
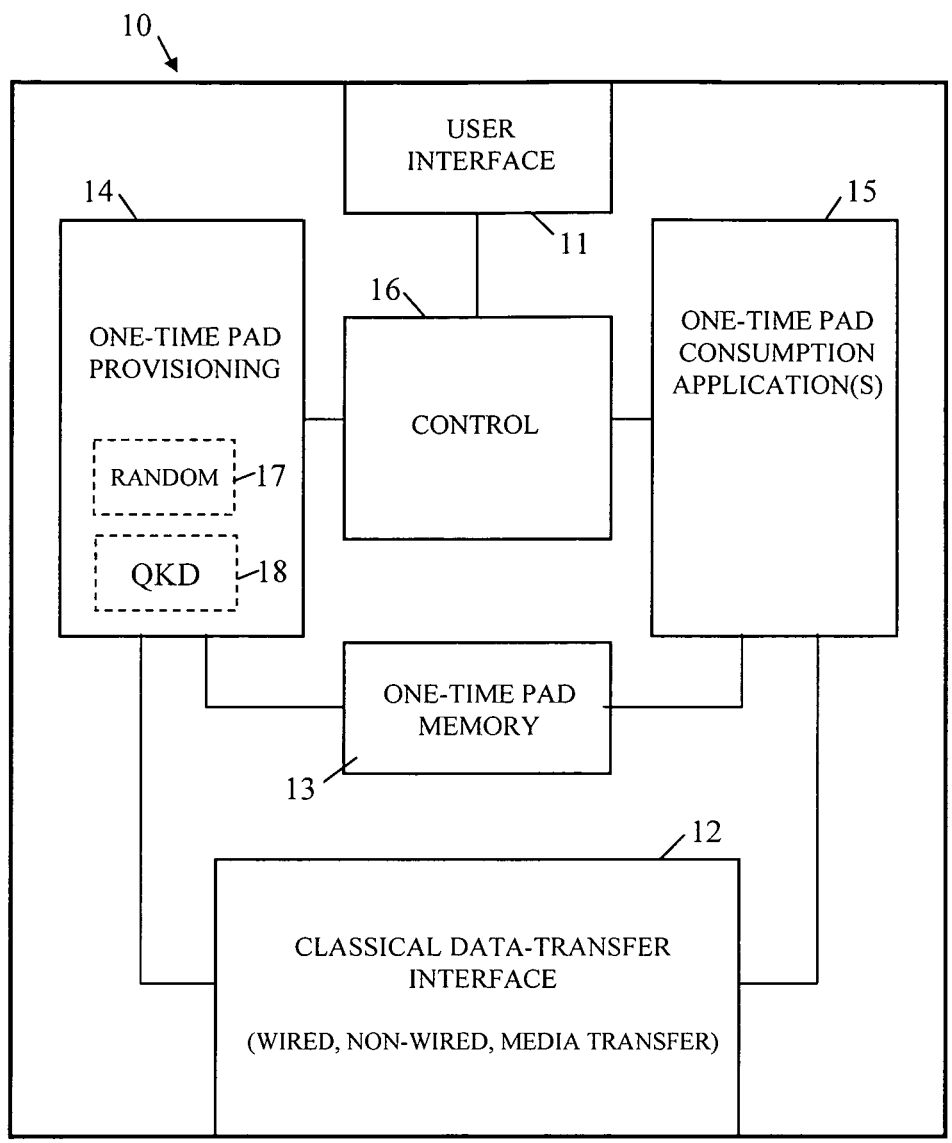
FIG. 1 is a diagram of a generalised form of user OTP device used in embodiments of the invention.

FIG. 1 shows, in generalized form, a user OTP device 10 for storing and using one-time pad data for various applications such as, for example, encryption and identification. Preferred embodiments of the device 10 are portable in form and are, for example, constituted by hand-held devices such as mobile phones and PDAs; however, other embodiments of the apparatus 10 can be of non-portable form such as a personal desktop computer.

In use, the OTP device 10 is intended to communicate with OTP apparatus having access to the same secret random data as the device 10 in order to conduct an OTP interaction (that is, an interaction requiring use of the same OTP data by the device and apparatus). Such OTP apparatus is hereinafter referred to as the "complementary OTP apparatus" with respect to the device 10; this apparatus can be of the same general form as the user OTP device 10 or can be of a different form and/or form part of a distributed system as will be described more fully hereinafter. Generally, the complementary OTP apparatus will be shown with a circular boundary in the Figures and will be referenced '20'.

The User OTP Device 10

The user OTP device 10 comprises the following functional blocks:
- a user interface block 11 for interfacing with a user;
- a classical data-transfer interface 12 for transferring data to and/or from external entities by wired or non-wired means, or by media transfer;
- a memory 13 for storing OTP data;
- an OTP provisioning block 14 which, through interaction with an external entity, is arranged to provide new secret random data for initializing or replenishing the memory 13 with OTP data;
- an OTP consumption block 15 for carrying out one or more applications that consume OTP data stored in memory 13; and
- a control block 16 for controlling and coordinating the operation of the other blocks in response to inputs received through the user interface 11 and the data-transfer interface 12.

Typically, the functional blocks 11 to 16 are implemented using a program-controlled processor together with appropriate specialized sub-systems. Further details of each block are given below for the case where a processor-based system (including a main processor and associated memory) is used to carry out at least most of the data processing tasks of the device 10, such tasks including, in particular, the control and coordination tasks of control block 16 and the running of the security applications embodying the OTP consumption block 15.

User Interface 11

The user interface 11 typically comprises an LCD display and an input keypad but may also include audio input and/or output means.

Classical Data-Transfer Interface 12

The classical data-transfer interface 12 can comprise a non-wired interface such as a Bluetooth (Trademark) wireless interface or an IrDA infrared interface; however, a wired interface can alternatively or additionally be provided such as an USB interface (as used herein, the term "wired" is to be understood broadly to cover any type of interface that requires electrical elements to be brought into physical contact). For circumstances where transit delay is not an issue, it is also possible to implement the data-transfer interface 12 as a removable storage medium and related read/write arrangement.

OTP Memory 13

The OTP memory 13 can be part of the general memory associated with the main processor of device 10 or can be formed by a separate memory. In either case, the OTP data is preferably secured against unauthorized access by one or more appropriate technologies. For example, the memory 13 can all be provided in a tamper-resistant hardware package. Alternatively, a protected storage mechanism can be used in which all but the root of a hierarchy (tree) of encrypted data objects is stored in ordinary memory, the root of the hierarchy being a storage root key which is stored in a tamper-resistant hardware package and is needed to decrypt any of the other data objects of the hierarchy. Furthermore, trusted platform techniques can be used to ensure that only authorized software can access the OTP data. It is also possible to use QRAM (Quantum RAM) technologies.

Where the device 10 is designed such that OTP data is consumed immediately following its provisioning, the security requirements of memory 13 can be reduced (unless the device 10 is designed to operate unattended).

OTP Provisioning Block 14

With regard to the OTP provisioning block 14, the most secure way to share secret random data is to use a quantum key distribution method such as described in the documents referenced in the introduction to the present specification. In this case, the OTP provisioning block is provided with a QKD subsystem 17 that can be either a QKD transmitter or a QKD receiver. It is relatively straightforward to incorporate a QKD transmitter within a hand-held device and then to provide a cradle or similar mechanical arrangement to ensure that the device is properly optically aligned to interact with a fixed QKD receiver subsystem. In fact, it is possible to dispense with a mechanical alignment arrangement by the use of an automated or semi-automated alignment system such as is disclosed in our co-pending UK patent application no. 0512929.6 filed 16 Jun. 2005.

The OTP provisioning block 14 need not be built around a QKD subsystem and a number of alternative embodiments are possible. Thus, in one such alternative embodiment the OTP provisioning block 14 is simply be arranged to store to the OTP memory 13, secret random data received via the data-transfer interface 12 from either:
(i) OTP apparatus seeking to share secret random data with the device 10 either directly or via a trusted data store;
(ii) a trusted random data generator that has the role of generating secret random data and passing it both to the user device 10 and to OTP apparatus with which the device 10 is wishing to interact using shared OTP data.

FIG. 2A illustrates the use of a trusted data store 21 for transferring secret random data to the device 10. In FIG. 2A, secret random data provided by the complementary OTP apparatus 20 is first passed to the trusted data store where it is held in memory 23 before being subsequently transferred to the OTP device 10. The trusted data store 21 can be infrastructure equipment or stand-alone equipment such as a handheld device.

FIG. 2B illustrates the use of a trusted random data generator 24. The trusted generator 24 includes a random data generation arrangement 22 for generating the random data, this data being generated at a time that the trusted random data generator 24 is in communication with the device 10 so that the random data can be passed immediately to the device 10. The trusted random data generator 24 also stores the random data it has generated in memory 23 and subsequently transfers this data to the complementary OTP apparatus 20. It will be appreciated that the random data could have been generated when the generator 24 was in communication with the apparatus 20 and then subsequently passed by the generator 24 to the device 10. It would also be possible for the generator 24 to only generate random data when in communication both the device 10 and apparatus 20 so that the random data is passed to both immediately, obviating the need for the memory 23. Conversely, the random data could be generated in advance of the trusted random data generator 24 being in communication with either of the device 10 and apparatus 20 in which case the random data is stored in memory 23 and subsequently passed to each of the device 10 and apparatus.

In the FIG. 2B form of the trusted random data generator 24, the random data is generated by the generator 24 acting alone. FIG. 2C shows a different form of the trusted random data generator 24 in which a QKD arrangement is used to generate the OTP data—in the illustrated scenario, the trusted random data generator 24 includes a QKD transmitter 26 arranged to interact with a QKD receiver 25 in the apparatus 20 in order to generate secret random data. The QKD transmitter 26 and receiver 25 can, of course, be swapped around; furthermore, the OTP data could alternatively be generated by a QKD interaction between the trusted generator 24 and a QKD entity in the device 10. As with the FIG. 2B trusted random data generator 24, the generator 24 of FIG. 2C also includes a memory 23 for storing the generated random data prior to transfer to the device 10 (or to the apparatus 20 if the QKD interaction was with the device 10).

The trusted random data generator 24 can be totally independent of the OTP device 10 and OTP apparatus 20 or can be associated with one of these entities—for example, the trusted random data generator 24 can be run by a bank that also runs the OTP apparatus 20.

Returning now to a consideration of the provisioning block 14 of the device 10, rather than the secret random data being generated using a QKD subsystem or being received by the provisioning block 14 from an external source, the OTP provisioning block 14 can include a random data generator 17 for generating random data which is both used to provision the memory 13 with OTP data, and passed via the data-transfer interface 12 directly or indirectly (including via a trusted data store) to other OTP apparatus with which the device 10 wishes to conduct OTP interactions. The random data generator is, for example, a quantum-based arrangement in which a half-silvered mirror is used to pass/deflect photons to detectors to correspondingly generate a "0"/"1" with a 50:50 chance; an alternative embodiment can be constructed based around overdriving a resistor or diode to take advantage of the electron noise to trigger a random event. Other techniques can be used for generating random data, particularly where a reduced level of security is acceptable—in such cases, some relaxation can be permitted on the randomness of the data allowing the use of pseudo random binary sequence generators which are well known in the art.

Where the secret random data is being received or being passed on via the classical data-transfer interface 12, it is highly desirable for the data to be encrypted (except possibly where a wired interface is being used to interface directly with OTP apparatus or a trusted data store). The encryption should not, of course, be based on the Vernam cipher using existing OTP data from the memory 13 since in this case as least as much OTP data would be consumed as newly provisioned; however the existing OTP data can be used to form a session key for the (relatively) secure transfer of the new secret random data.

It will be appreciated that the level of security that applies to the sharing of secret random data between the device 10 and other OTP apparatus sets the maximum level of security that can be achieved using a one-time pad formed from this data; accordingly, if the user of the device 10 wishes to use the OTP data held in the device 10 to achieve very high levels of security for data transfer from the device, then the initial sharing of the secret random data must involve corresponding levels of security; however, if the OTP data is only to be used for applications that do not warrant the highest levels of security, then the security surrounding secret random data sharing can be relaxed.

It will also be appreciated that the sharing of the secret random data used for the one-time pads is generally restricted to entities that know something about each other (such as their respective identities or some other attribute); accordingly, the sharing of the secret random data will normally be preceded by a verification or qualification process during which each entity satisfies itself that the other entity possesses appropriate attributes. This applies not only for the OTP device 10 and the complementary OTP apparatus 20, but also to the trusted data store 21 and the trusted random data generator 24 which should check the attributes of any entity purporting to entitled to receive OTP data before such data is passed on to that entity.

The provisioning block 14 can simply append newly-obtained secret random data to the existing OTP data in memory 13 or can combine the new secret random data with the existing OTP data using a merge function, the merged data then replacing the previous contents of the memory 13. Preferably, the merge function is such that an eavesdropper who has somehow managed to obtain knowledge of the new secret random data, cannot derive any part of the merged data without also having knowledge of the pre-existing OTP data in the memory 13. A wide range of possible merge functions exist including functions for encrypting the new secret random data using the existing OTP data for the encrypting key, and random permutation functions (it will be appreciated that whatever merge function is used, it must be possible for the complementary OTP apparatus to select and use the same function on its copy of the new secret random data and its existing OTP data). Merging of the new secret random data and existing OTP data otherwise than by aggregation, can only be done if the device 10 and the complementary OTP apparatus have the same existing OTP data which should therefore be confirmed between the device and apparatus before the new secret random data and existing OTP data are subject to merging. In this respect, it will be appreciated that the OTP device 10 and the complementary OTP apparatus may not have the same existing OTP data for a variety of reasons such as a failed communication between the device and apparatus resulting in one of them consuming OTP data but not the other. Of course, it will frequently be possible for the OTP device and the complementary OTP apparatus to cooperate such that if either of them still has OTP data already discarded by the other, then that entity also discards the same data (one method of doing this is described later). However, it will not always be possible for the device 10 and the complementary OTP apparatus to cooperate in this way, or even check whether they have the same existing OTP data, at the time that one or other of the device and apparatus is provided with new secret random data—for example, if the OTP device is being replenished with new secret random data by communication with a trusted random data generator, it may well be that the trusted random data generator is not concurrently in communication with the OTP apparatus, the new secret random data only being subsequently shared with the OTP apparatus. In this type of situation, the new secret random data must be appended to the existing OTP data rather than being merged with it.

OTP Consumption Block 15

The OTP consumption block 15 is arranged to carry out tasks ('applications') that require the use ('consumption') of OTP data from the memory 13; it is to be understood that, unless otherwise stated herein, whenever data is used from the OTP data held in memory 13, that data is discarded. As already indicated, the OTP consumption block 15 is preferably provided by arranging for the main processor of the device 10 to execute OTP application programs; however, the consumption block 15 can additionally/alternatively comprise specialized hardware processing elements particularly where the OTP application to be executed involves complex processing or calls for high throughput.

A typical OTP consumption application is the generation of a session key for the exchange of encrypted messages with the complementary OTP apparatus; in this case, the complementary OTP apparatus can generate the same session key itself. Of course, the device 10 can securely communicate with the complementary OTP apparatus by encrypting data to be sent using the Vernam cipher—however, this would require the use of as much OTP data as there was data to be exchanged and so give rise to rapid consumption of the OTP data from memory 13.

Another OTP consumption application is the evidencing that the device 10 (or its owner/user) possesses a particular attribute. As already noted, the distribution of the secret random data used for the one-time pads is generally restricted to entities that know something about each other, such as their respective identities or the possession of other particular attributes (in the present specification, reference to attributes possessed by an entity includes attributes of a user/owner of the entity). An example non-identity attribute is an access authorisation attribute obtained following a qualification process that may involve the making of a payment. The secret random data will only be shared after each entity (or a trusted intermediary) has carried out some verification/qualification process in respect of the identity or other attributes of the other entity concerned. This verification/qualification can simply be by context (a bank customer replenishing their device 10 from an OTP apparatus within a bank may be willing to accept that the secret random data being received is shared only with the bank); however, verification/qualification can involve checking of documentary evidence (for example, a paper passport), or an automatic process such as one based on public/private keys and a public key infrastructure. Whatever verification/qualification process is used to control the sharing of secret random data, once such sharing has taken place, OTP data based on the secret random data can be used to prove the identity or other attributes of the possessor of the OTP data. Thus, for example, if OTP apparatus knows that it shares OTP data with an OTP device 10 with identity "X", then the device 10 can identify itself to the complementary OTP apparatus by sending it a data block from the top of its one-time pad; the apparatus then searches for this data block in the one or more OTP pads it possesses and if a match is found, it knows that it is communicating with entity "X". To aid finding a match, the device 10 preferably sends the OTP apparatus an identifier of the one-time pad that the device is proposing to use.

As already noted, communication failures and other issues can result in different amounts of OTP data being held by the OTP device 10 and the complementary OTP apparatus; more particularly, the data at the top of the one-time pad held by device 10 can differ from the data at the top of the one-time pad held by the complementary OTP apparatus. This is referred to herein as "misalignment" of the one-time pads. It is therefore convenient for the OTP device and the complementary OTP apparatus to each obtain or maintain a measure indicating how far it has progressed through its OTP data; this measure can also be thought of as a pointer or index to the head of the OTP pad and is therefore referred to below as the "head index". Preferably, the head index is taken as the remaining size of the OTP data; although other measurements can be used for the head index (such as how much OTP data has been used), measuring the remaining size of the OTP data can be done at any time and so does not require any on-going maintenance. Whatever actual numeric value of the measure used for the head index, in the present specification the convention is used, when discussing head index values, that the nearer the top of the one-time pad is to the bottom of the pad, the "lower" is the value of the head index.

The head index is used to correct for misalignment of the one time pads held by the device 10A and the complementary OTP apparatus as follows. At the start of any OTP interaction, the device 10 and complementary OTP apparatus exchange their head indexes and one of them then discards data from the top of its one-time pad until its head index matches that received from the other—that is, until the one-time pads are back in alignment at the lowest of the exchanged head index values. When OTP data is used by the device or apparatus in conducting the OTP transaction, the head index is sent along with the OTP interaction data (e.g. an OTP encrypted message) to enable the recipient to go directly to the correct OTP data in its one-time pad; this step can be omitted since although the one-time pads may have become misaligned by the time a message with OTP interaction data successfully passes in one direction or the other between the device and apparatus, this misalignment is likely to be small and a trial-and-error process can be used to find the correct OTP data at the receiving end.

The Complementary OTP Apparatus

With regard to the complementary OTP apparatus with which the OTP device 10 shares the same OTP data and can therefore conduct an OTP-based interaction, this can be constituted by apparatus in which all three functions of OTP storage, provisioning, and consumption are contained within the same item of equipment (as with the device 10); such OTP apparatus is referred to herein as "self-contained" OTP apparatus. However, it is also possible for the complementary OTP apparatus to be distributed in form with one of the OTP storage, provisioning, and consumption functions being in a separate item of equipment from the other two, or with all three functions in separate items of equipment to the OTP storage and provisioning functions; such OTP apparatus is referred to herein as "distributed" OTP apparatus. In distributed OTP apparatus it is, of course, necessary to ensure an adequate level of security for passing OTP data between its distributed functions. It is conceivable that one or both of the provisioning and consumption functions are provided by equipment that is also used by another distributed OTP apparatus.

To illustrate the different roles that self-contained and distributed OTP apparatus can play, FIG. 3 shows the OTP device 10 conducting an OTP interaction with a distributed data processing system 27 such as a banking system. The distributed system 27 comprises a central computer facility 28 that communicates with a plurality of customer-interfacing units 29 by any suitable communications network. The device 10 can communicate with one or more of the units 29 using its classical data-transfer interface 12.

In one possible scenario, each of the units 29 is a self-contained OTP apparatus holding OTP data that is distinct from the OTP data held by any other unit 29; in this case, assuming that the device 10 only holds one pad of OTP data, it is restricted to interacting with the unit 29 that holds the same pad. Alternatively, the OTP device 10 can be arranged to hold multiple pads of OTP data each corresponding to a pad held by a respective one of the units 29, the device 10 then needing to use data from the correct pad for the unit 29 with which it wishes to conduct an OTP interaction.

In an alternative scenario, the central computer facility 28 is a self-contained OTP apparatus, the device 10 conducting the OTP interaction with the facility 28; in this case, each of the units 29 is simply a communications relay for passing on the OTP interaction messages.

In a further alternative scenario, the central computer facility 28 holds the OTP data shared with the device 10 but the units 29 are consumers of that data; in this case, the device 10 conducts the OTP interaction with one of the units, the unit obtaining the needed OTP data from the facility 28 over the internal network of the distributed system. In this scenario, the distributed system 27 forms a distributed OTP apparatus.

It may be noted that in the last scenario, it is possible to arrange for each of the units 29 to be capable of taking part in an OTP provisioning operation with the device 10, either by passing on to the central computer facility 28 secret random data provided by the device 10, or by generating random data and passing it both to the device 10 and to the central facility 28; in this latter case, the units 29 independently generate their random data.

Whatever the form of the complementary OTP apparatus, it may have been designed to carry out OTP interactions with multiple different devices 10, each with its own OTP data. This requires that the complementary OTP apparatus hold multiple different pads of OTP data, one for each device 10 with which it is to conduct OTP interactions; it also requires that the OTP apparatus uses the correct OTP data when interacting with a particular OTP device 10. One way of enabling the OTP apparatus to determine quickly which is the correct pad of OTP data to use in respect of a particular device 10, is for each pad to have a unique identifier which the device sends to the apparatus when an OTP interaction is to be conducted. It is not necessary for this identifier to be sent securely by the device 10 (unless there are concerns about an eavesdropper tracking patterns of contact between particular devices and the apparatus).

Increased-Security Consumption

For increased levels of security, the consumption block 15 of the OTP device 10 not only uses a one-time pad, but also uses data from the one-time pad in combination.

Consider, for example, the use of OTP data to encrypt a message. Normally, a message m is encrypted by XORing (Exclusive ORing) the message with an equivalent-length block of OTP data. Thus, if the message m comprises a succession of bits $m_1$, $m_2$, $m_3$, etc and the one-time pad comprises a succession of bits [a] [b] [c] [d] [e] [f] etc, then encryption of the message m using one OTP bit per bit of message, results in the following ciphertext:

Ciphertext=$m_1$ XOR [a], $m_2$ XOR [b], $m_3$ XOR [c], etc.

If an eavesdropper Eve knows the message (known plaintext attack), then Eve can determine the OTP contents [a] [b] [c] etc. which may give Eve information about how the one-time pad was provisioned or provide some other insight of use to Eve.

Figure 4:
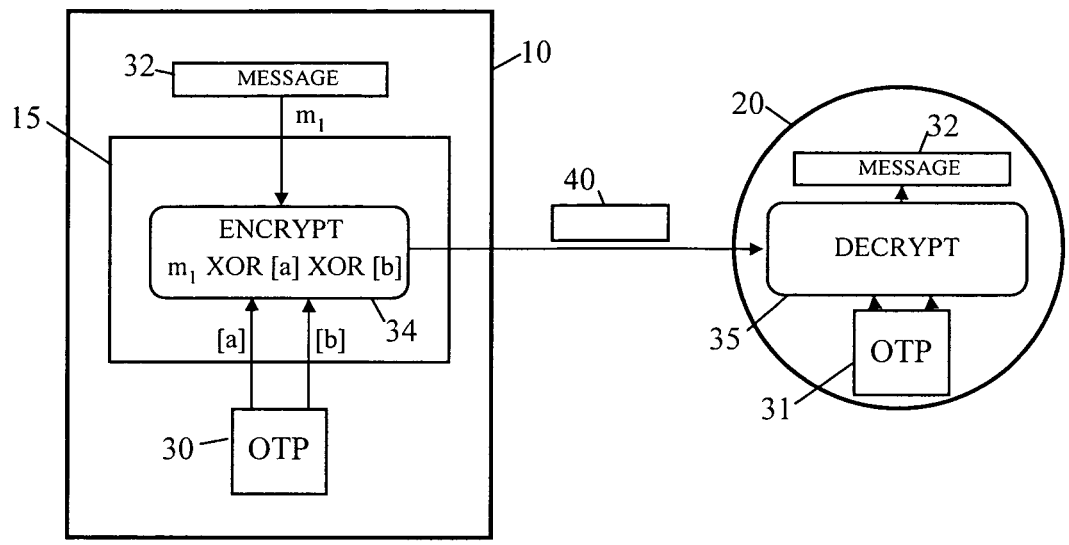
FIG. 4 is a diagram illustrating encryption of a message in which each message bit is encrypted using multiple OTP data bits.

It is therefore more secure to use two (or more) OTP bits to encrypt each message bit as is depicted in FIG. 4. In FIG. 4 an OTP device 10 is illustrated as encrypting a message 32 and sending it as ciphertext 40 to complementary OTP apparatus 20 where it is decrypted to recover the message 32. For clarity, only the consumption block 15 of the device 10 is shown, the block 15 being depicted as executing an encryption application 34 to encrypt the message 32 using data from a one-time pas 30 (held in OTP memory 13, not shown). The encryption process 34 encrypts each message bit by using two bits from the one-time pad 30. Thus, if the message m is again taken as comprising a succession of bits $m_1$, $m_2$, $m_3$, etc. and the one-time pad is taken as comprising a succession of bits [a] [b] [c] [d] [e] [f] etc, then the following ciphertext 40 is obtained:

Ciphertext=$m_1$ XOR [a] XOR [b], $m_2$ XOR [c]XOR [d], $m_3$ XOR [e] XOR [f], etc.

A decryption process 35 of the apparatus 20 reverses the process, decrypting each ciphertext bit using two bits from its one-time pad 31—for example, message bit m is recovered from the first ciphertext bit $c_1$ by computing ($c_1$ XOR [a'] XOR [b']) where [a'] and [b'] are the first two bits of the one-time pad 31.

Now even if Eve knows the message m, Eve can only find out the values of [a]XOR[b], [c]XOR[d], etc. but not the values of [a], [b], [c], [d] etc. Of course, the price for this extra security is that more OTP data is used.

It will be appreciated that other encryption functions can be used in place of the XOR function.

Multiplied usage of OTP data to give increased security can also be applied to attribute verification. It will be recalled that OTP data can be used to prove that the device (or its user) possesses a particular attribute where the possession of this attribute by the device (or its user) was verified at the time the OTP data was provisioned to the device. Attribute verification as previously described involved sending OTP from the device to the apparatus. However, this enables an eavesdropper to see the OTP data which might be of some value to the eavesdropper. Accordingly, a more secure attribute verification process can be implemented based on the device 10 generating an attribute verifier by combining OTP data in a predetermined manner that conceals the OTP data involved.

Figure 5:
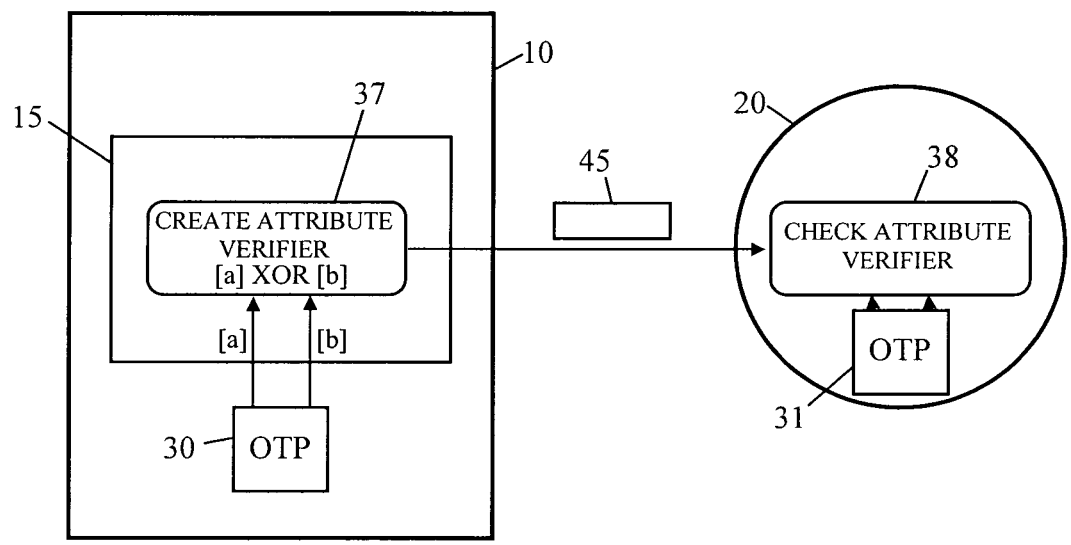
FIG. 5 is a diagram illustrating generation of an attribute verifier by combining together blocks of one-time pad data.

More particularly, FIG. 5 illustrates an OTP device 10 with consumption block 15 and OTP pad 30; again, for clarity, the other functional blocks of the device 10 are not shown. To prove to a complementary OTP apparatus 20 that the device 10 possesses a particular attribute, the block 15 executes an application 37 to create an attribute verifier 45 and send it to the apparatus. The attribute verifier is formed, in this example, by XORing together the top two data blocks of the OTP pad 30. On receiving the attribute verifier, the apparatus 20 executes a check process 38 using the equivalent data blocks from its own one-time pad 31 (for example, the check process XORs the top two blocks of the pad 31 and compares the result with the verifier received from the device 10; alternatively, the two top blocks of the pad 31 are XORed with the received verifier—this will produce an all zero result if the two top blocks of the pad 31 correspond to the blocks from pad 30 used to produce the verifier).

The process for creating the attribute verifier in the FIG. 5 embodiment can be viewed as encrypting one OTP data block using another OTP data block as the encrypting key.

It will be appreciated that the attribute verifier can be formed by combining together more than two data blocks from the one-time pad 30 (thus if the first three blocks are [a] [b] [c], the attribute verifier can be formed as [a] XOR [b] XOR [c]). It will also be appreciated that other combining functions can be used instead of the XOR function provided the function successfully conceals the OTP data.

In the embodiment described above with respect to FIGS. 4 and 5, the pads 30 and 31 are preferably aligned before the applications 34, 37 are executed (though a trial-an-error approach can alternatively be adopted). Furthermore, the embodiments of FIGS. 4 and 5 can be implemented regardless of how the one-time pad data has been provisioned to the device 10.

It will be appreciated that many variants are possible to the above described embodiments of the invention.

For example, although in the foregoing, embodiments of the invention have been described in relation to an OTP device that incorporates, in a self-contained form, OTP storage, provisioning, and consumption, it is to be understood that the device could generally be replaced by a distributed arrangement of its functional blocks.

Furthermore, encrypting a data by combining it with at least two OTP data bits, is not restricted to protecting a message to be transmitted but can be applied to protecting data to be stored securely and subsequently recovered (potentially by the same device as that which encrypted it).

The invention claimed is:

1. A method of using one-time pad data performed by a processor-based system, the method comprising:

encrypting data, with said processor-based system, by combining a first succession of bits of the data being encrypted with a second succession of bits from said one-time pad data;

in which one set of bits of a size from said first succession of bits is combined with at least two sets of bits of at least said size from said second succession of bits to form an output, said size comprising at least one bit;

wherein the first succession of bits comprise a message to be encrypted, said output being the encrypted message;

such that decryption of the encrypted message comprises combining together the encrypted message and a copy of said second succession of bits.

2. A method according to claim 1, wherein bits from said first succession of bits are combined with bits from said second succession of bits by Exclusive ORing.

3. A method according to claim 1, wherein each set of bits from said first succession of bits is encrypted by being combined with a combination of said at least two sets of bits from said second succession of bits, said combination being formed by Exclusive OR operation.

4. A method according to claim 1, wherein a combination of a number of bits from said second succession of bits is used as an attribute verifier.

5. The method of claim 1, in which said at least two sets of bits are consecutive sets within said second succession of bits.

6. The method of claim 1, in which each said one set of bits from said first succession of bits is combined with a different said at least two sets of bits from said second succession of bits.

7. A device comprising:
a memory for holding one-time pad data, and
a hardware data processor arranged;
to receive a first succession of bits and a second succession of bits representing said one-time pad data; and
to encrypt said first succession of bits by combining a set of bits of a size from said first succession of bits with a combination of at least two sets of bits of at least said size from said second succession of bits to form an output, in which said size comprises at least one bit;

wherein said first succession of bits represent a message to be encrypted, said output being the encrypted message;

such that decryption of the encrypted message comprises combining together the encrypted message and a copy of said second succession of bits.

8. A device according to claim 7, wherein the data processor is arranged to combine together said set of bits from said first succession of bits to said combination by Exclusive ORing.

9. A device according to claim 7, wherein said combination is formed using an Exclusive OR operation.

10. A device according to claim 7, wherein a combination of a number of bits from said second succession of bits is used as an attribute verifier.

11. The device of claim 7, in which, in which said at least two sets of bits are consecutive sets within said second succession of bits.

12. The device of claim 7, in which each said one set of bits from said first succession of bits is combined with a different said at least two sets of bits from said second succession of bits.

* * * * *

UNITED STATES PATENT AND TRADEMARK OFFICE
CERTIFICATE OF CORRECTION

| | | |
|---|---|---|
| PATENT NO. | : 9,191,198 B2 | Page 1 of 1 |
| APPLICATION NO. | : 11/455231 | |
| DATED | : November 17, 2015 | |
| INVENTOR(S) | : Keith Alexander Harrison et al. | |

It is certified that error appears in the above-identified patent and that said Letters Patent is hereby corrected as shown below:

Claims

In column 12, line 3, in Claim 7, delete "arranged;" and insert -- arranged --, therefor.

Signed and Sealed this
Third Day of May, 2016

Michelle K. Lee
*Director of the United States Patent and Trademark Office*